(12) United States Patent
Mizuno et al.

(10) Patent No.: US 8,208,074 B2
(45) Date of Patent: Jun. 26, 2012

(54) INFORMATION PROCESSING APPARATUS AND METHOD, COMPUTER PROGRAM, AND INFORMATION PROCESSING SYSTEM

(75) Inventors: Chikara Mizuno, Tochigi (JP); Jun Takeshita, Tokyo (JP); Hiroaki Itou, Kanagawa (JP); Yoichi Hirota, Kanagawa (JP); Hidetoshi Yamaguchi, Saitama (JP)

(73) Assignee: Sony Corporation (JP)

( * ) Notice: Subject to any disclaimer, the term of this patent is extended or adjusted under 35 U.S.C. 154(b) by 303 days.

(21) Appl. No.: 12/559,552

(22) Filed: Sep. 15, 2009

(65) Prior Publication Data
US 2010/0079674 A1 Apr. 1, 2010

(30) Foreign Application Priority Data
Sep. 26, 2008 (JP) ............................. P2008-247908

(51) Int. Cl.
H04N 5/14 (2006.01)
(52) U.S. Cl. ...................................... 348/571
(58) Field of Classification Search .................. 348/571, 348/725, 723, 575, 576, 552, 553; 386/96, 386/95
See application file for complete search history.

(56) References Cited

U.S. PATENT DOCUMENTS
2007/0277216 A1* 11/2007 Nakajima ...................... 725/133
2008/0195923 A1* 8/2008 Masumori ...................... 714/821
2009/0046993 A1* 2/2009 Nishio ............................ 386/96
2009/0073316 A1* 3/2009 Ejima ............................ 348/515
2009/0317059 A1* 12/2009 Chen et al. ..................... 386/95
2011/0064373 A1* 3/2011 Doser et al. ................... 386/201

FOREIGN PATENT DOCUMENTS
JP 2002-320158 10/2002
JP 2004-229313 8/2004
JP 2006-217571 8/2006
WO WO 2007/102413 9/2007

OTHER PUBLICATIONS
Japanese Office Action for Japanese Patent Application No. 2008-247908 dated Jul. 20, 2010.

* cited by examiner

Primary Examiner — Paulos Natnael
(74) Attorney, Agent, or Firm — Finnegan, Henderson, Farabow, Garrett & Dunner LLP

(57) ABSTRACT

An information processing apparatus includes: video-signal transmitting and receiving means for transmitting/receiving a video signal to/from one or more external apparatuses; image-quality-improvement processing means for applying image quality improvement processing based on an image quality improvement processing function of the information processing apparatus to the video signal; holding means for holding performance of the image quality improvement processing function concerning the image-quality-improvement processing means; CEC transmitting means for transmitting the performance held by the holding means to the external apparatuses; receiving means for receiving performances of image quality improvement processing functions of the one or more external apparatuses; and control means for comparing the performance of the image quality improvement processing function and the performances of the image quality improvement processing functions of the one or more external apparatuses received by the receiving means and controlling, based on a comparison result, execution of the image quality improvement processing.

10 Claims, 8 Drawing Sheets

FIG.7

| Opcode | Parameters | | | |
|---|---|---|---|---|
| <Vendor Command with ID> | [Vendor ID] | [Vendor Specific Data] | | |
| | | IMAGE QUALITY IMPROVEMENT PROCESSING PERFORMANCE INFORMATION | IMAGE QUALITY IMPROVEMENT PROCESSING GENEALOGY TYPE | VERSION NUMBER, ETC. |
| 1 BYTE | 1 BYTE | n BYTES | m BYTES | 1 BYTE |

FOR EXAMPLE, ALLOCATE IMAGE QUALITY IMPROVEMENT PROCESSING GENEALOGY TYPES AS FOLLOWS:
· TECHNIQUE "XXX" OF TELEVISION MANUFACTURE A IS 0x01
· TECHNIQUE "YYY" OF TELEVISION MANUFACTURE A IS 0x02
· TECHNIQUE "ZZZ" OF IMAGE QUALITY PROCESSING LSI MANUFACTURE B IS 0x03

FIG.8

| Opcode | Parameters | |
|---|---|---|
| <Vendor Command with ID> | [Vendor ID] | [Vendor Specific Data] |
| | | IMAGE IMPROVEMENT PROCESSING PERFORMANCE INFORMATION REQUEST |
| 1 BYTE | 1 BYTE | n BYTES |

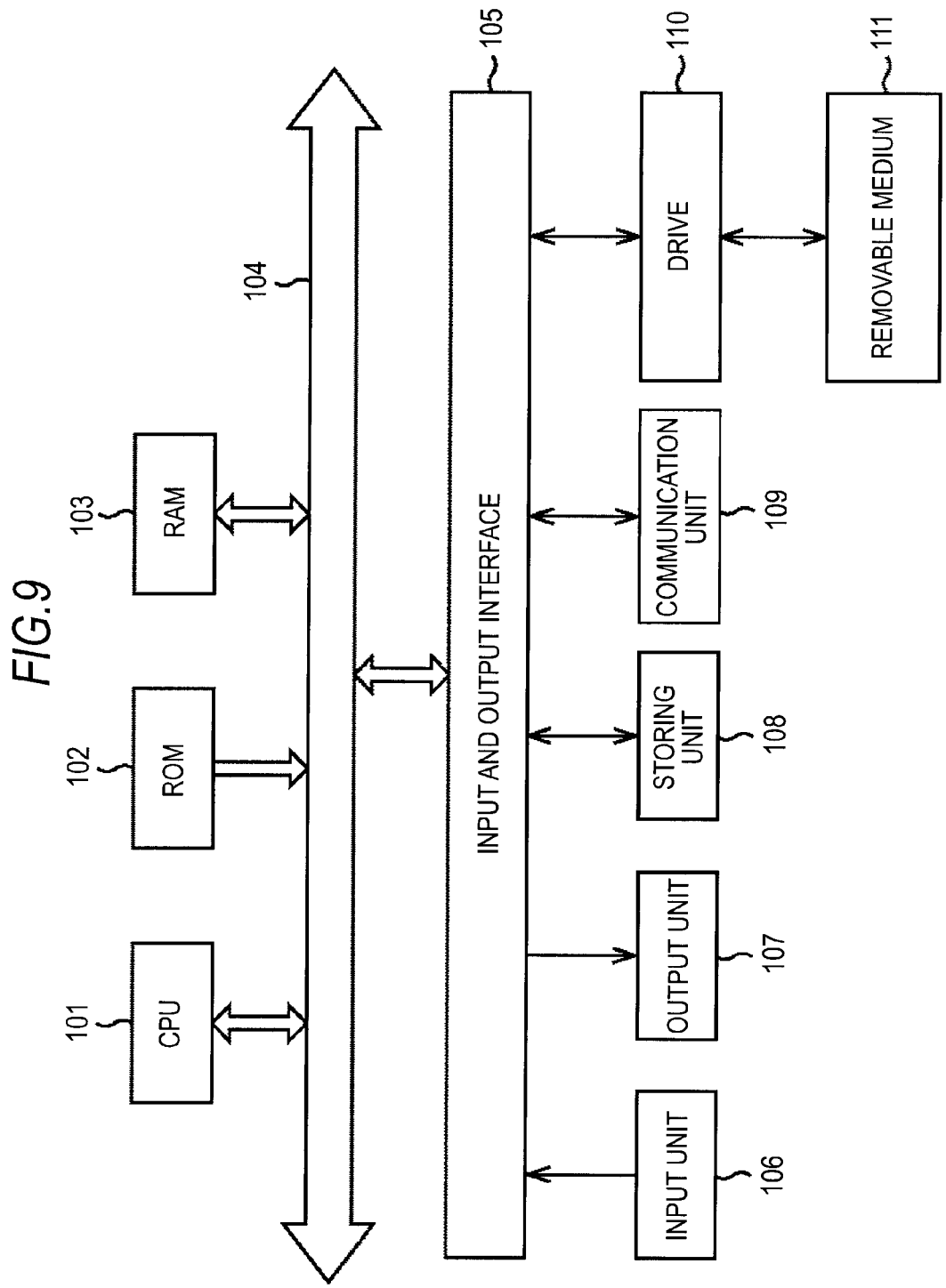

INFORMATION PROCESSING APPARATUS AND METHOD, COMPUTER PROGRAM, AND INFORMATION PROCESSING SYSTEM

BACKGROUND OF THE INVENTION

1. Field of the Invention

The present invention relates to an information processing apparatus, an information processing method, a computer program, and an information processing system, and, more particularly to an information processing apparatus, an information processing method, a computer program, and an information processing system.

2. Description of the Related Art

A high definition television receiver (hereinafter abbreviated as television receiver) has a function of scaling a standard image quality (an image quality of a standard definition television (SDTV)) to a high definition television image quality (am image quality of a high definition television (HDTV)) (hereinafter referred to as scaling function). In recent years, there are an increasing number of television receivers mounted with, as image improvement processing functions, not only the scaling function but also independent image quality improvement processing functions (see, for example, JP-A-2004-229313).

SUMMARY OF THE INVENTION

However, there are also a large number of amplifiers and video players mounted with similar image quality improvement processing functions. Some apparatuses among these apparatuses are mounted with LSIs (Large Scale Integrations) that realize the image quality improvement processing functions adopted in the television receivers (hereinafter referred to as image quality LSI).

In order to appeal the image quality improvement processing functions mounted on the apparatuses such as the television receivers and the video players, the apparatuses are often shipped in a state in which the image quality improvement processing functions thereof are set valid. Therefore, a user may purchase two or more apparatuses such as a television receiver and a video player mounted with the same image quality LSIs and connect the two or more apparatuses. In such a case, when the two or more apparatuses operate while the setting of the image improvement processing functions is kept in the shipped state, an apparatus closest to a signal source applies processing for the scaling function to an image quality and the other apparatuses apply the same processing to the image quality. Therefore, the same processing is applied to the image quality two or more times.

In designing the image quality improvement processing functions, a method of use for applying the same processing or processing by similar techniques twice is not intended by a designer. Such a method of use does not contribute to image quality improvement and, moreover, is likely to deteriorate an image quality.

When the two or more apparatuses operate while the setting of the scaling function is kept in the shipped state and the scaling function of the apparatus closest to the signal source has lowest performance, the scaling function with highest performance is not used. In this case, naturally, an image quality of an image viewed by the user is an unintended image quality for the designer of the scaling function with highest performance.

In the case explained above, the user views the image with the image quality unintended by the designer. In order to view the image with an appropriate image quality, first, the user specifies an apparatus having the image quality improvement processing function with highest performance among the apparatuses in use. The user invalidates the setting of the image quality improvement processing functions of all the other apparatuses according to apparatus operation while keeping the setting of the image quality improvement processing function valid only for the apparatus having the image quality improvement processing function with high performance. Through such work, the user can view the image with an appropriate image quality. However, time and labor are spent for the work.

Therefore, it is desirable to provide the user with an image quality intended by the designer.

According to an embodiment of the present invention, there is provided an information processing apparatus including: video-signal transmitting and receiving means for transmitting and receiving a video signal to and from one or more external apparatuses; image-quality-improvement processing means for applying image quality improvement processing based on an image quality improvement processing function of the information processing apparatus to the video signal; holding means for holding performance of the image quality improvement processing function of the information processing apparatus concerning the image-quality-improvement processing means; transmitting means for transmitting the performance of the image quality improvement processing function of the image processing apparatus held by the holding means to the external apparatuses; receiving means for receiving performances of image quality improvement processing functions of the one or more external apparatuses; and control means for comparing the performance of the image quality improvement processing function of the information processing apparatus held by the holding means and the performances of the image quality improvement processing functions of the one or more external apparatuses received by the receiving means and controlling, on the basis of a result of the comparison, execution of the image quality improvement processing by the image-quality-improvement processing means.

According to another embodiment of the present invention, there are provided an information processing method and a computer program corresponding to the information processing apparatus according to the embodiment explained above.

In the image processing apparatus, the image processing method, and the computer program according to the embodiments, the image processing apparatus or a computer for controlling the same compares the performance of the image quality improvement processing function of the information processing apparatus held by the holding means and the performances of the image quality improvement processing functions of the one or more external apparatuses received by the receiving means and controls, on the basis of a result of the comparison, execution of the image quality improvement processing by the image-quality-improvement processing means.

An information processing system according to still another embodiment of the present invention includes one or more information processing apparatuses corresponding to the information processing apparatus according to the embodiment explained above.

In the information processing system according to the embodiment, each of the one or more information processing apparatuses compares the performance of the image quality improvement processing function of the information processing apparatus held by the holding means and the performances of the image quality improvement processing functions of the one or more external apparatuses received by the receiving means and controls, on the basis of a result of the comparison, execution of the image quality improvement processing by the image-quality-improvement processing means.

As explained above, according to the embodiments of the present invention, it is possible to display an image with an image quality intended by designers.

BRIEF DESCRIPTION OF THE DRAWINGS

FIG. 7 is a diagram of an example of the structure of <Vendor Specific Command> of CEC control information adopted as image quality improvement processing performance information;

FIG. 8 is a diagram of an example of the structure of <Vendor Specific Command> of CEC control information adopted as an image quality improvement processing performance information request; and FIG. 9 is a block diagram of a hardware configuration example of an information processing apparatus according to an embodiment of the present invention.

DESCRIPTION OF THE PREFERRED EMBODIMENTS

Embodiments of the present invention are explained in detail below with reference to the accompanying drawings.
Configuration Example of an Information Processing System FIG. 1 is a block diagram of a configuration example of an information processing system according to an embodiment of the present invention.

Figure 1:
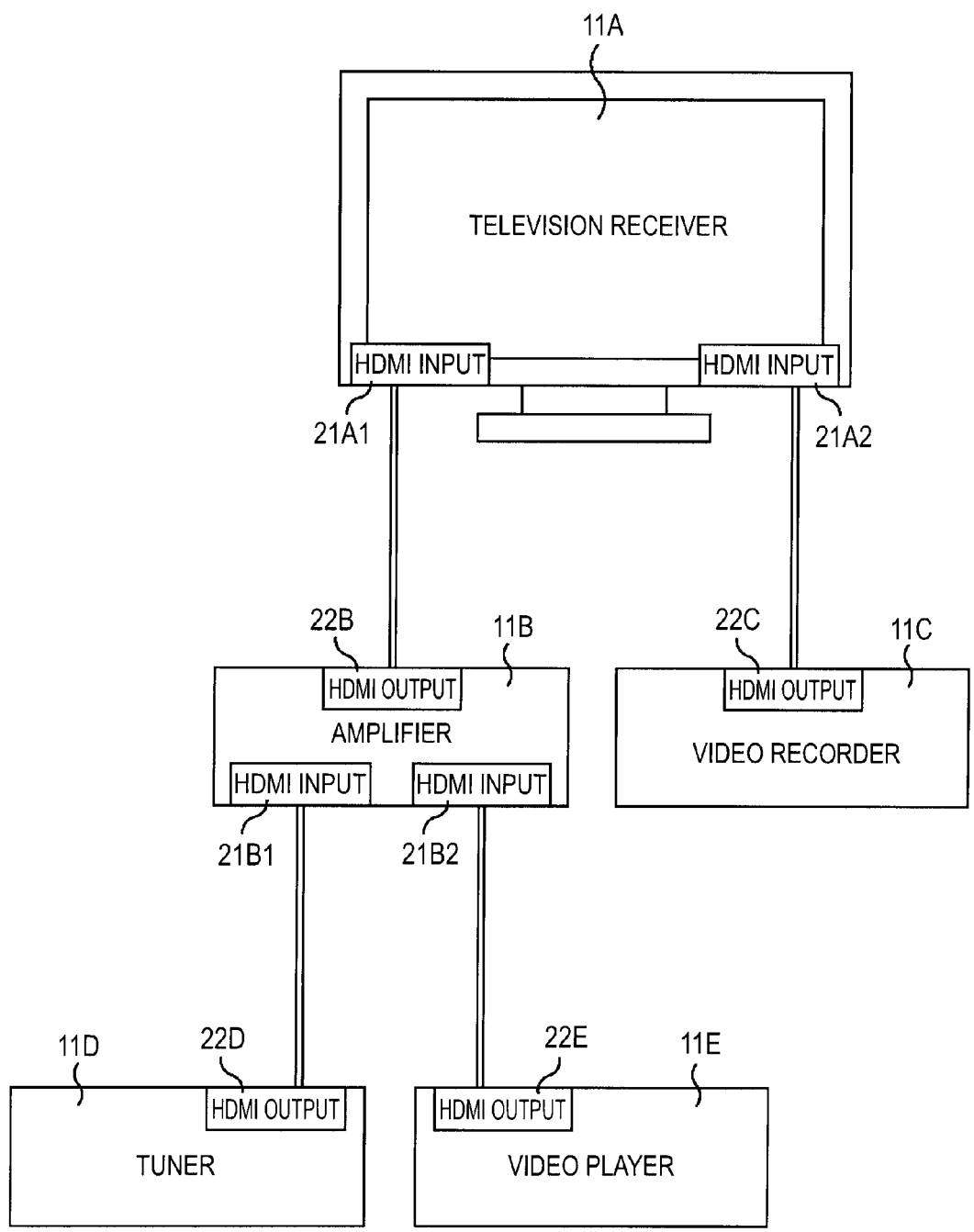
FIG. 1 is a block diagram of a configuration example of an information processing system.

The information processing system shown in FIG. 1 includes a television receiver 11A, an amplifier 11B, a video recorder 11C, a tuner 11D, and a video player 11E.

The television receiver 11A, the amplifier 11B, the video recorder 11C, the tuner 11D, and the video player 11E are connected to the other apparatuses via an HDMI (High Definition Multimedia Interface).

The apparatuses connected via the HDMI are hereinafter referred to as HDMI apparatuses. That is, in the following explanation, when it is unnecessary to distinguish the television receiver 11A, the amplifier 11B, the video recorder 11C, the tuner 11D, and the video player 11E from one another, these apparatuses are collectively referred to as HDMI apparatuses 11.

Each of the HDMI apparatuses 11 is mounted with one or more image quality improvement processing functions. The image quality improvement processing functions are functions that can apply predetermined image quality improvement processing to a video signal. As the predetermined image quality improvement processing, there are scaling, interlace/progressive conversion, enhancement, noise reduction, and the like. In this embodiment, one kind of image quality improvement processing function is classified for each genealogy. The genealogy means a type that indicates a result obtained by classifying image quality improvement processing functions of the same kind according to a predetermined criterion for determining superiority. The predetermined criterion is not specifically limited as long as superiority of performance can be determined. For example, various criteria such as classification for each manufacturer of the HDMI apparatuses 11, classification for each manufacturer of an image quality improvement processing circuit, and classification for each image quality improvement processing algorithm can be adopted as the predetermined criterion. Performance of the image quality improvement processing functions is determined according to a genealogy type.

What should be taken note of is that, although the HDMI apparatuses 11 are mounted with the image quality improvement processing functions, the HDMI apparatuses 11 do not always execute image quality improvement processing. In other words, among image quality improvement processing functions of the same kind mounted on the HDMI apparatuses 11, respectively, only an image quality improvement processing function with highest performance is set valid and the other image quality improvement processing functions are set invalid. As a result, only the HDMI apparatus 11 mounted with the image quality improvement processing function with highest performance applies the image quality improvement processing to a video signal. Therefore, the image quality improvement processing of the same kind is not applied two or more times. A video of an optimum image quality intended by designers is displayed.

In this embodiment, the HDMI apparatuses 11 independently determine and execute setting of valid or invalid of the image quality improvement processing functions. For this purpose, the HDMI apparatuses 11 need to share information indicating performances of the image quality improvement processing functions mounted on the HDMI apparatuses 11. This embodiment is explained on the premise that the HDMI apparatuses 11 respectively have information indicating performances of image quality improvement processing of the HDMI apparatuses 11 (hereinafter referred to as image quality improvement performance information). Under such a premise, the HDMI apparatuses 11 transmit and receive the image quality improvement processing performance information to and from one another to acquire the image quality improvement processing performance information. The HDMI apparatuses 11 can share the image quality improvement processing function performance information.

A form of transmission and reception of the image quality improvement processing performance information is not specifically limited. In this embodiment, CEC (Consumer Electronics Control) is used. That is, in the HDMI standard, CEC for communicating control information such as commands and messages among the HDMI apparatuses 11 is defined. When the CEC is used, it is possible to perform various kinds of control on the basis of peculiar physical addresses and logical addresses allocated to HDMI apparatuses.

For example, in the CEC, a mutual apparatus control function can be realized among the HDMI apparatuses by transmitting and receiving predetermined control information (hereinafter referred to as CEC control information). Therefore, in this embodiment, "image quality improvement processing performance information" and an "image quality improvement processing performance information request" are transmitted and received among the HDMI apparatuses 11 in a form of the CEC control information. The "image quality improvement processing performance information request" is information for requesting other HDMI apparatuses to broadcast the "image quality improvement processing performance information". Specific examples of the "image quality improvement processing performance information" and the "image quality improvement processing performance information request" are explained later with reference to FIGS. 7 and 8, respectively.

Functional Block Diagram of the Information Processing System

Figure 2:
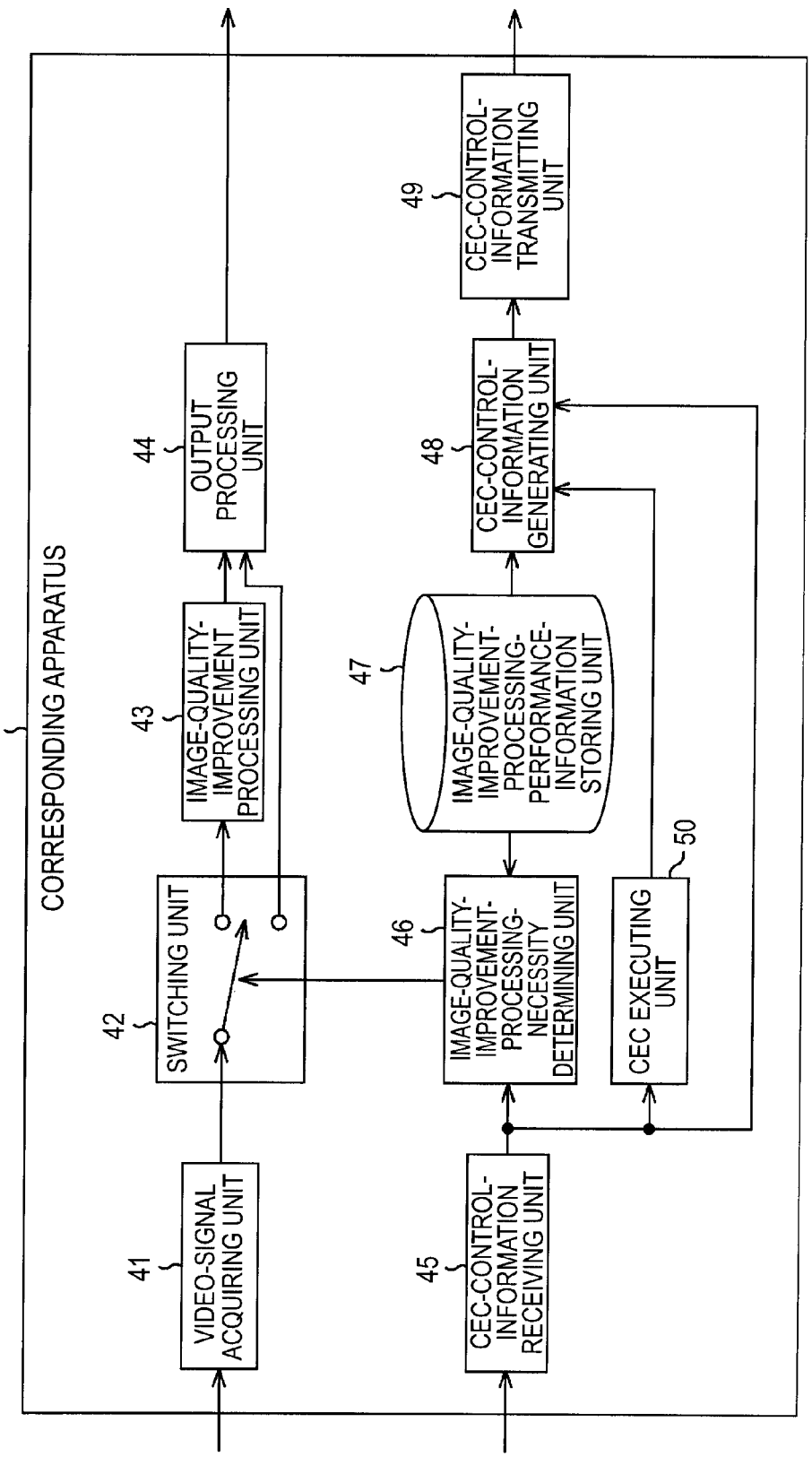
FIG. 2 is a functional block diagram of a functional configuration example of a corresponding apparatus 11.

FIG. 2 is a functional block diagram of a functional configuration example of a corresponding apparatus 11 according to this embodiment.

The present invention is not applied to some HDMI apparatus 11 among the HDMI apparatuses 11. Therefore, in the following explanation, the HDMI apparatus 11 to which the present invention is applied is referred to as corresponding apparatus 11. On the other hand, the HDMI apparatus 11 to which the present invention is not applied is referred to as non-corresponding apparatus 11. Each of the television receiver 11A, the amplifier 11B, the video recorder 11C, the tuner 11D, and the video player 11E may be the corresponding apparatus 11 or may be the non-corresponding apparatus 11. In the following explanation, when an apparatus is simply described as the HDMI apparatus 11, the apparatus could be both the corresponding apparatus 11 and the non-corresponding apparatus 11.

The corresponding apparatus 11 includes a video-signal acquiring unit 41, a switching unit 42, an image-quality-improvement processing unit 43, and an output processing unit 44. The corresponding apparatus 11 also includes a CEC-control-information receiving unit 45, an image-quality-improvement-processing-necessity determining unit 46, an image-quality-improvement-processing-performance-information storing unit 47, a CEC-control-information generating unit 48, a CEC-control-information transmitting unit 49, and a CEC executing unit 50.

The video-signal acquiring unit 41 acquires a video signal transmitted from another HDMI apparatus 11 and provides the switching unit 42 with the acquired video signal.

The switching unit 42 switches a transmission path under the control by the image-quality-improvement-processing-necessity determining unit 46.

Specifically, for example, when the image-quality-improvement-processing-necessity determining unit 46 determines that image quality improvement processing is necessary, the switching unit 42 provides the image-quality-improvement processing unit 43 with the video signal provided from the video-signal acquiring unit 41. On the other hand, when the image-quality-improvement-processing-necessity determining unit 46 determines that the image quality improvement processing is unnecessary, the switching unit 42 provides the output processing unit 44 with the video signal provided from the video-signal acquiring unit 41. A determining method by the image-quality-improvement-processing-necessity determining unit 46 is explained later.

The image-quality-improvement processing unit 43 applies the image quality improvement processing to the video signal from the switching unit 42 according to a predetermined image quality improvement processing function, which is a predetermined image quality improvement processing function by genealogy type. The image-quality-improvement processing unit 43 provides the output processing unit 44 with the video signal subjected to the image quality improvement processing.

In this way, an image subjected to the image quality improvement processing by the image-quality-improvement processing unit 43 or an image directly provided from the switching unit 42 (an image not subjected to the image quality improvement processing) is provided to the output processing unit 44. The output processing unit 44 outputs, as an output signal, the video signal provided from the image-quality-improvement processing unit 43 or the switching unit 42.

The CEC-control-information receiving unit 45 receives CEC control information transmitted from another HDMI apparatus 11. When, for example, image quality improvement performance information of the other HDMI apparatus 11 is included in the CEC control information, the image quality improvement performance information of the other HDMI apparatus 11 is provided to the image-quality-improvement-processing-necessity determining unit 46. When, for example, an image quality improvement processing performance information request is included in the CEC control information, the image quality improvement performance information request is provided to the CEC-control-information generating unit 48. The CEC control information except the image quality improvement performance information or the image quality improvement processing performance information request is provided to the CEC executing unit 50.

The image-quality-improvement-processing-necessity determining unit 46 of the HDMI apparatus 11 compares the image quality improvement processing performance information of the other HDMI apparatus 11 from the CEC-control-information receiving unit 45 and image quality improvement processing performance information of the HDMI apparatus 11 stored in the image-quality-improvement-processing-performance-information storing unit 47 to determine necessity of the image quality improvement processing.

Specifically, for example, it is assumed that the corresponding apparatuses 11 are mounted with an image quality improvement processing function of the same kind, which is an image quality improvement processing function of the same genealogy type. Image quality improvement processing performance is represented by a 1-byte image quality improvement processing performance value. It is defined that a larger image quality improvement processing performance value means higher performance. Image quality improvement processing performance information is assumed to be 1-type information indicating the image quality improvement processing performance value. Such a premise is valid up to the explanation given with reference to FIG. 6 below.

Under such a premise, when the image quality improvement processing performance value of the HDMI apparatus 11 is a maximum value, this means that the image quality improvement processing function mounted on the HDMI apparatus 11 has highest performance compared with the image quality improvement processing functions mounted on the other HDMI apparatuses 11. Therefore, in such a case, the image-quality-improvement-processing-necessity determining unit 46 determines that the image quality improvement processing is necessary. Then, an output destination of the switching unit 42 is switched to the image-quality-improvement processing unit 43. Consequently, the video signal acquired by the video-signal acquiring unit 41 is provided to the image-quality-improvement processing unit 43 and subjected to the image quality improvement processing and then provided to the output processing unit 44. In other words, when it is determined that the image quality improvement processing is necessary and the output destination of the switching unit 42 is switched to the image-quality-improvement processing unit 43, it can also be grasped that the image quality improvement processing function is set valid.

On the other hand, when the image quality improvement processing performance value of the HDMI apparatus 11 is not the maximum value, this means that the image quality improvement processing function mounted on any one of the other HDMI apparatuses 11 has highest performance. In such a case, if the image quality improvement processing of the HDMI apparatus 11 is applied, the situation explained in Summary of the Invention occurs. Therefore, in such a case, the image-quality-improvement-processing-necessity determining unit 46 determines that the image quality improvement processing is unnecessary. Then, the output destination of the switching unit 42 is switched to the output processing unit 44. Consequently, the video signal acquired by the video-signal acquiring unit 41 is directly provided to the output processing unit 44 without being subjected to the image quality improvement processing. In other words, when it is determined that the image quality improvement processing is unnecessary and the output destination of the switching unit 42 is switched to the output processing unit 44, it can also be grasped that the image quality improvement processing function is set invalid.

The image-quality-improvement-processing-performance-information storing unit 47 stores image quality improvement processing performance information of the HDMI apparatus 11.

For example, when an image quality improvement processing performance information request is provided from the CEC-control-information receiving unit 45, the CEC-control-information generating unit 48 generates CEC control information including the image quality improvement processing performance information stored in the image-quality-improvement-processing-performance-information storing unit 47. The generated CEC control information is provided to the CEC-control-information transmitting unit 49. The CEC-control-information transmitting unit 49 transmits the CEC control information, which is provided from the CEC-control-information generating unit 48, to another HDMI apparatus 11. When the other HDMI apparatus 11 is the corresponding apparatus 11, for the other corresponding apparatus 11 at the transmission destination, the CEC control information (the image quality improvement processing performance information) transmitted from the CEC-control-information transmitting unit 49 is treated as "image quality improvement processing performance information of the other HDMI apparatus 11".

The CEC executing unit 50 executes predetermined CEC control using the CEC control information from the CEC-control-information receiving unit 45 as appropriate. During the execution of the CEC control, the CEC executing unit 50 instructs, according to necessity, the CEC-control-information generating unit 48 to generate predetermined CEC control information. The CEC-control-information generating unit 48 generates the predetermined CEC control information as instructed. The generated CEC control information is provided to the CEC-control-information transmitting unit 49. The CEC-control-information transmitting unit 49 transmits the CEC control information, which is provided from the CEC-control-information generating unit 48, to the other HDMI apparatuses 11. Consequently, various kinds of CEC control such as a one touch play function explained later is realized.

As an example of the processing of the corresponding apparatus 11, the processing in a first situation and the processing in a second situation are separately explained below with reference to FIGS. 3 to 6.
1. First situation (when an input of a television receiver is switched)
2. Second situation (when a one touch play function of a video player is used)

First Situation

In the example shown in FIG. 1, as candidates of a path through which a video signal is propagated, i.e., an active AV path, there are first to third paths explained below. The first path refers to a path through which the video signal is propagated in order of the tune 11D, the amplifier 11B, and the television receiver 11A. The second path refers to a path through which the video signal is propagated in order of the video player 11E, the amplifier 11B, and the television receiver 11A. The third path refers to a path through which the video signal is propagated in order of the video recorder 11C and the television receiver 11A. Only one of the first to third paths is active as a path through which the video signal is propagated. An active path among the paths through which the video signal is propagated is hereinafter referred to as active AV path.

In the first situation, it is assumed that the active AV path is switched from the third path to the second path. In other words, it is assumed that an input of the television receiver 11A is switched to an HDMI input 21A1 and, at that point, an HDMI input 21B2 is selected as an input of the amplifier 11B. In this case, the video player 11E is an active source apparatus and the active AV path is the second path. It is assumed that the HDMI apparatuses 11 have already acquired physical addresses and logical addresses.

Figure 3:
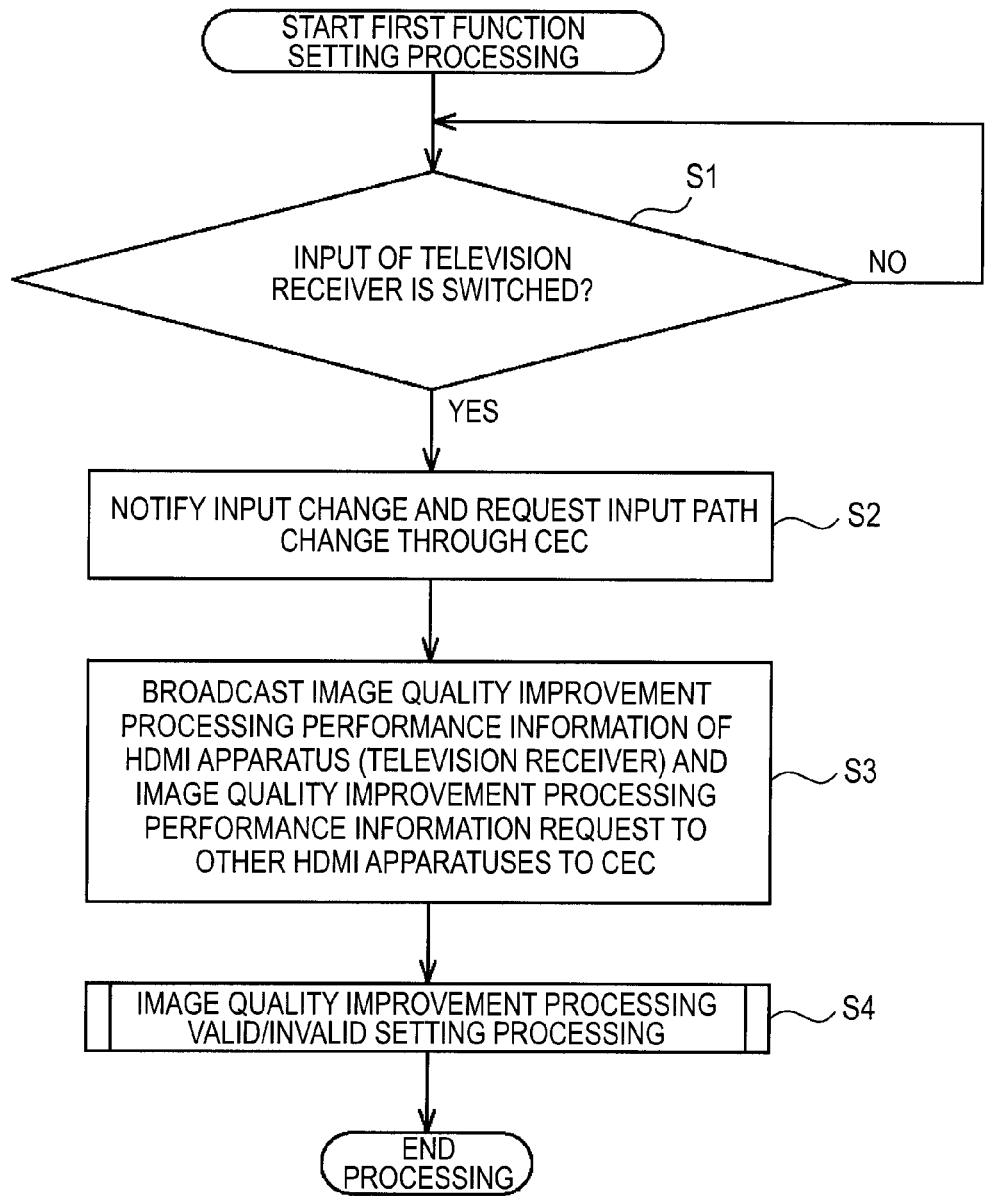
FIG. 3 is a flowchart for explaining an example of first function setting processing.

In this case, the television receiver 11A executes first function setting processing shown in FIG. 3.

First Function Setting Processing

FIG. 3 is a flowchart for explaining an example of the first function setting processing executed by the television receiver 11A.

In step S1, the television receiver 11A determines whether an input of the television receiver 11A is switched.

Since the active AV path is not switched until the input is switched, the television receiver 11A determines in step S1 that the input is not switched (NO in step S1) and the processing is returned to step S1. The determination processing in step S1 is repeated.

As explained above, in the first situation, the input of the television receiver 11A is switched to the HDMI input 21A1. Therefore, the television receiver 11A determines in step S1 that the input is switched (YES in step S1) and the processing proceeds to step S2.

In step S2, the television receiver 11A notifies an input change and requests an input path change through CEC. Specifically, the television receiver 11A transmits <Routing Change> as CEC control information to notify the other HDMI apparatuses 11 of an input change and transmits <Set Stream Path> as CEC control information to request the other HDMI apparatuses 11 to change an input path. Consequently, the active AV path is switched to the second path.

The above is processing as a premise of the first situation.

In step S3, the television receiver 11A broadcasts, to the CEC, image quality improvement processing performance information of the television receiver 11A and an image quality improvement processing performance information request to the other HDMI apparatus 11.

In step S4, the television receiver 11A determines necessity of image quality improvement processing for the television receiver 11A and sets valid/invalid of an image quality improvement processing function on the basis of a result of the determination. Such a series of processing is hereinafter referred to as image quality improvement processing valid/invalid setting processing. A detailed example of the image quality improvement processing valid/invalid setting processing is explained later with reference to a flowchart of FIG. 5.

Figure 4:
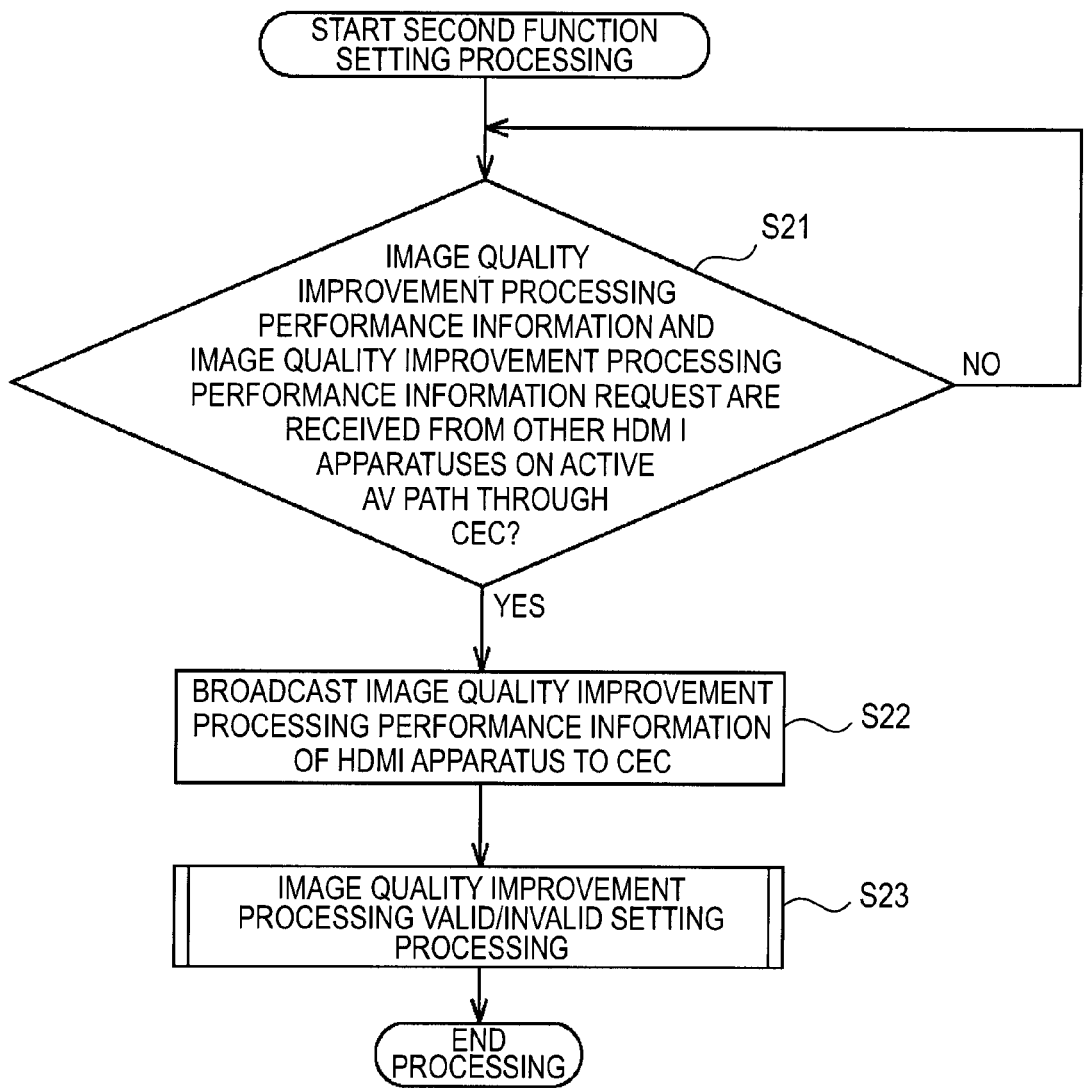
FIG. 4 is a flowchart for explaining an example of second function setting processing.

While the television receiver 11A is executing the first function setting processing in this way, the other HDMI apparatuses 11, i.e., in the first situation, the video player 11E and the amplifier 11B execute second function setting processing shown in FIG. 4.

Second Function Setting Processing

FIG. 4 is a flowchart for explaining an example of the second function setting processing executed by the HDMI apparatus 11.

When CEC functions of the corresponding apparatuses 11 shown in FIG. 1 are valid, in principle, the corresponding apparatuses 11 executes the second function setting processing shown in FIG. 4. The second function setting processing is executed "in principle" because, for example, in the first situation, as explained above, there is an exception that the television receiver 11A executes the first function setting processing shown in FIG. 3.

Since the first situation is explained in this context, in the following explanation, it is assumed that an operation entity is the amplifier 11B. The videoplayer 11E also executes the second function setting processing in parallel.

In step S21, the amplifier 11B determines whether image quality improvement processing performance information and an image quality improvement processing performance information request are received from the other HDMI apparatuses 11 on the active AV path through the CEC.

For example, in the following explanation, it is assumed that the first path is the active AV path. In this case, the other HDMI apparatuses 11 on the active AV path mean the tuner 11D and the television receiver 11A. Therefore, until image quality improvement processing performance information and an image quality improvement processing performance information request are received from the tuner 11D or the television receiver 11A, the amplifier 11B determines in step S21 that image quality improvement processing performance information and an image quality improvement processing performance information request are not received (NO in step S21). Consequently, the processing is returned to step S21 and the determination processing in step S21 is repeatedly executed.

Thereafter, according to the processing in step S3 in FIG. 3, the television receiver 11A broadcasts image quality improvement processing performance information and an image quality improvement processing performance information request. Therefore, when the amplifier 11B receives the image quality improvement processing performance information and the image quality improvement processing performance information request, the amplifier 11B determines in step S21 that the image quality improvement processing performance information and the image quality improvement processing performance information request are received (YES in step S21) and the processing proceeds to step S22.

In step S22, the amplifier 11B broadcasts image quality improvement processing performance information of the amplifier 11 to the CEC.

In step S23, the amplifier 11B executes the image quality improvement processing valid/invalid setting processing. A detailed example of the image quality improvement processing valid/invalid setting processing is explained below with reference to FIG. 5.

Image Quality Improvement Processing Valid/Invalid Setting Processing

Figure 5:
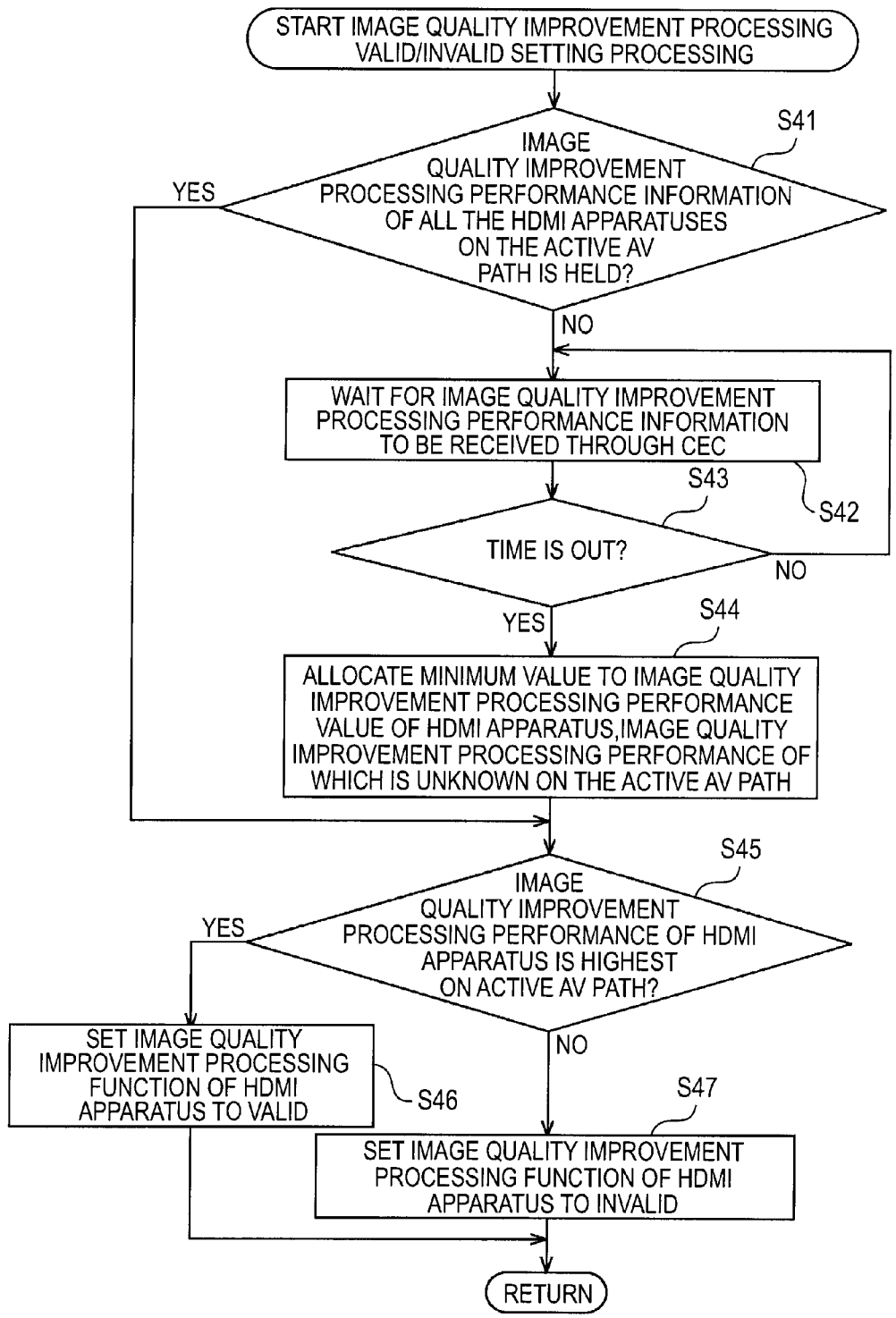
FIG. 5 is a flowchart for explaining an example of image quality improvement processing valid/invalid setting processing.

FIG. 5 is a flowchart for explaining the detailed example of the image quality improvement processing valid/invalid setting processing. In the explanation, in principle, an operation entity is the corresponding apparatus 11. As a specific example, the television receiver 11A that executes the first function setting processing shown in FIG. 3 or the amplifier 11B that executes the second function processing shown in FIG. 4 is an operation entity as appropriate.

In step S41, the corresponding apparatus 11 determines whether the corresponding apparatus 11 holds image quality improvement processing performance information of all the HDMI apparatuses 11 on the active AV path.

Specifically, the television receiver 1A broadcasts the image quality improvement processing performance information in the processing in step S3 in FIG. 3. Consequently, the amplifier 11B and the video player 11E broadcast image quality improvement processing performance information of the amplifier 11B and the video player 11E in the processing in step S22 in FIG. 4. Therefore, thereafter, when the television receiver 11A executes the determination processing in step S41, the television receiver 11A determines in step S41 that the television receiver 11A holds the image quality improvement processing performance information request of all the HDMI apparatuses 11 (YES in step S41) and the processing proceeds to step S45. Processing in step S45 and subsequent steps is explained later.

On the other hand, when the television receiver 11A executes the determination processing in step S41 before the execution of the processing in step S22 in FIG. 4 by the amplifier 11B and the video player 11E, the television receiver 11A determines in step S41 that the television receiver 11A does not hold image quality improvement processing performance information of all the HDMI apparatuses 11 (NO in step S41) and the processing proceeds to step S42.

In step S42, the corresponding apparatus 11 waits for image quality improvement processing performance information to be received through the CEC. Specifically, for example, the television receiver 11A waits for image quality improvement processing performance information of both the amplifier 11B and the video player 11E to be received.

In step S43, the corresponding apparatus 11 determines whether time is out.

When time is not out, the corresponding apparatus 11 determines in step S43 that time is not out (NO in step S43) and the processing is returned to step S42. The processing in step S42 and subsequent steps is repeatedly executed. In other words, the loop processing in steps S42 and S43 is repeatedly executed until time is out.

Thereafter, when fixed time elapses and time is out, the corresponding apparatus 11 determines in step S43 that time is out (YES in step S43) and the processing proceeds to step S44.

In step S44, the corresponding apparatus 11 allocates a minimum value to an image quality improvement processing performance value of the HDMI apparatus 11, image quality improvement processing performance of which is unknown on the active AV path.

As explained above, in this example, image quality improvement processing performance is represented by a 1-byte image quality improvement processing performance value and it is defined that a larger image quality improvement processing performance value means higher performance. Therefore, in this example, "0" is adopted as a minimum value.

Specifically, for example, it is assumed that image quality improvement processing performance information of the amplifier 11B is not received at a stage when the television receiver 11A repeats the loop processing in steps S42 and S43, time is out, and the processing proceeds to step S44. In such a case, "0" is forcibly allocated as an image quality improvement processing performance value of the amplifier 11B.

For example, in this embodiment, the HDMI apparatuses 11 on the active AV path are the corresponding apparatuses 11. However, the non-corresponding apparatus 11 may be present among the HDMI apparatuses 11 on the active AV path. In such a case, since image quality improvement processing performance information is not transmitted from the non-corresponding apparatus 11, "0" is forcibly allocated as an image quality improvement processing performance value of the non-corresponding apparatus 11.

In step S45, the corresponding apparatus 11 determines whether image quality improvement processing performance of the corresponding apparatus 11 is the highest on the active AV path. Specifically, the corresponding apparatus 11 determines whether an image quality improvement processing performance value of the corresponding apparatus 11 is a maximum value among those of all the HDMI apparatuses 11 on the active AV path.

When the corresponding apparatus 11 determines in step S45 that the image quality improvement processing performance of the corresponding apparatus 11 is the highest on the active AV path, the processing proceeds to step S46. In step S46, the corresponding apparatus 11 sets an image quality improvement processing function of the corresponding apparatus 11 valid. "Set valid" in this context is a concept in a broad sense including not only switching invalid setting to valid setting but also maintaining, when setting is originally valid setting, the valid setting.

On the other hand, when the corresponding apparatus 11 determines in step S45 that the image quality improvement processing performance of the corresponding apparatus 11 is not the highest on the active AV path, the processing proceeds to step S47.

In step S47, the corresponding apparatus 11 sets an image quality improvement processing function of the corresponding apparatus 11 invalid. "Set invalid" in this context is a concept in a broad sense including not only switching valid setting to invalid setting but also maintaining, when setting is originally invalid setting, the invalid setting.

Specifically, for example, it is assumed that image quality improvement processing performance values of the video player 11E, the amplifier 11B, and the television receiver 11A on the active AV path are "2", "1", and "3", respectively. Further, it is assumed that the video player 11E, the amplifier 11B, and the television receiver 11A exchange image quality improvement processing performance information with one another by the point of the processing in step S45.

In this case, the image quality improvement processing performance value of the television receiver 11A is a maximum value "3". Therefore, in the image quality improvement processing valid/invalid setting processing by the television receiver 11A, in the processing in step S45, the television receiver 11A determines that image quality improvement processing performance of the television receiver 11A is the highest (YES in step S45). In the processing in step S46, the television receiver 11A sets an image quality improvement processing function of the television receiver 11A valid.

On the other hand, in the image quality improvement processing valid/invalid setting processing by the video player 11E and the amplifier 11B, the video player 11E and the amplifier 11B determine in the processing in step S45 that image quality improvement processing performances of the video player 11E and the amplifier 11B are not the highest (NO in step S45). In the processing in step S47, the video player 11E and the amplifier 11B set image quality improvement processing functions of the video player 11E and the amplifier 11B invalid.

Consequently, a video signal is propagated as explained below. A video signal reproduced in the video player 11E is acquired by the video-signal acquiring unit 41 of the video player 11E shown in FIG. 2. Since the image quality improvement processing function of the video player 11E is set invalid, an output destination of the switching unit 42 is switched to the output processing unit 44 side. Therefore, when the video signal output from the video-signal acquiring unit 41 passes through the switching unit 42, the video signal is directly provided to the output processing unit 44 without passing through the image-quality-improvement processing unit 43, i.e., without being subjected to image quality improvement processing and is output as an output signal.

The output signal of the videoplayer 11E, i.e., the video signal not subjected to the image improvement processing is acquired by the video-signal acquiring unit 41 of the amplifier 11B shown in FIG. 2. Since the image quality improvement processing function of the amplifier 11B is set invalid, the output destination of the switching unit 42 is switched to the output processing unit 44 side. Therefore, when the video signal output from the video-signal acquiring unit 41 passes through the switching unit 42, the video signal is directly provided to the output processing unit 44 without passing through the image-quality-improvement processing unit 43, i.e., without being subjected to image quality improvement processing and is output as an output signal.

The output signal of the amplifier 11B, i.e., the video signal not subjected to the image improvement processing is acquired by the video-signal acquiring unit 41 of the television receiver 11A shown in FIG. 2. Since the image quality improvement processing function of the television receiver 11A is set valid, the output destination of the switching unit 42 is switched to the image-quality-improvement processing unit 43 side. Therefore, when the video signal output from the video-signal acquiring unit 41 passes through the switching unit 42, the video signal is input to the image-quality-processing unit 43. Specifically, the video signal is subjected to the image quality improvement processing in the image-quality-improvement processing unit 43 in the television receiver 11A, provided to the output processing unit 44, and output as an output signal.

A video corresponding to the output signal, i.e., a video corresponding to the video signal subjected to the image quality improvement processing only once on the active AV path is displayed on a display unit in the television receiver 11A.

In this way, only the image quality improvement processing by one HDMI apparatus 11 is applied to the video signal. Therefore, a video of an optimum image quality intended by the designer is displayed.

The user can also set the image quality improvement processing functions of the HDMI apparatuses 11 according to operation. For example, the user can also set the image quality improvement processing function of the television receiver 11A invalid on purpose according to operation. In such a case, for example, the television receiver 11A only has to set the image quality improvement processing performance value of the television receiver 11A to "0" and broadcast the image quality improvement processing performance value to the CEC. Then, according to the example explained above, the image quality improvement processing performance value of the video player 11E is a maximum value "2". Therefore, the image quality improvement processing function of the video player 11E is set valid and the image quality improvement processing functions of the television receiver 11A and the amplifier 11B are set invalid. In this case, as in the case explained above, since only the image quality improvement processing by one HDMI apparatus 11 is applied to the video signal, a video of an optimum image quality intended by the designer is displayed. As the processing in steps S3 and S22, the HDMI apparatus 11 may adopt processing for transmitting the image quality improvement processing performance information of the HDMI apparatus 11 to a specific HDMI apparatus 11 on the active AV path instead of the processing for broadcasting the image quality improvement processing performance information to the CEC.

When the series of processing is executed, only the corresponding apparatus 11 having highest image quality improvement processing performance among the HDMI apparatuses 11 on the active AV path applies the image quality improvement processing to the video signal. Consequently, it is possible to provide the user with a video with an image quality intended by the designer.

Second Situation

In the second situation, it is assumed that, in the information processing apparatus shown in FIG. 1, the play of the video player 11E is started when the input of the television receiver 11A is set on the HDMI input 21A2 side. It is assumed that, thereafter, the one touch play function of the CEC works and the input of the television receiver 11A is automatically switched to the HDMI input 21A1 side. Consequently, the active AV path changes to the second path. In other words, a video signal is propagated in order of the video player 11E, the amplifier 11B, and the television receiver 11A. It is assumed that the HDMI apparatuses 11 have already acquired physical addresses and logical addresses.

The one touch play function is a function explained below. Of the two HDMI apparatuses 11, the HDMI apparatus 11 that supplies a video signal is referred to as source apparatus. On the other hand, the HDMI apparatus 11 that outputs a video corresponding to the supplied video signal is referred to as sink apparatus. In this case, a function with which the sink apparatus realizes processing for switching an input of the sink apparatus to the source apparatus according to control information from the source apparatus is the one touch play function.

Figure 6:
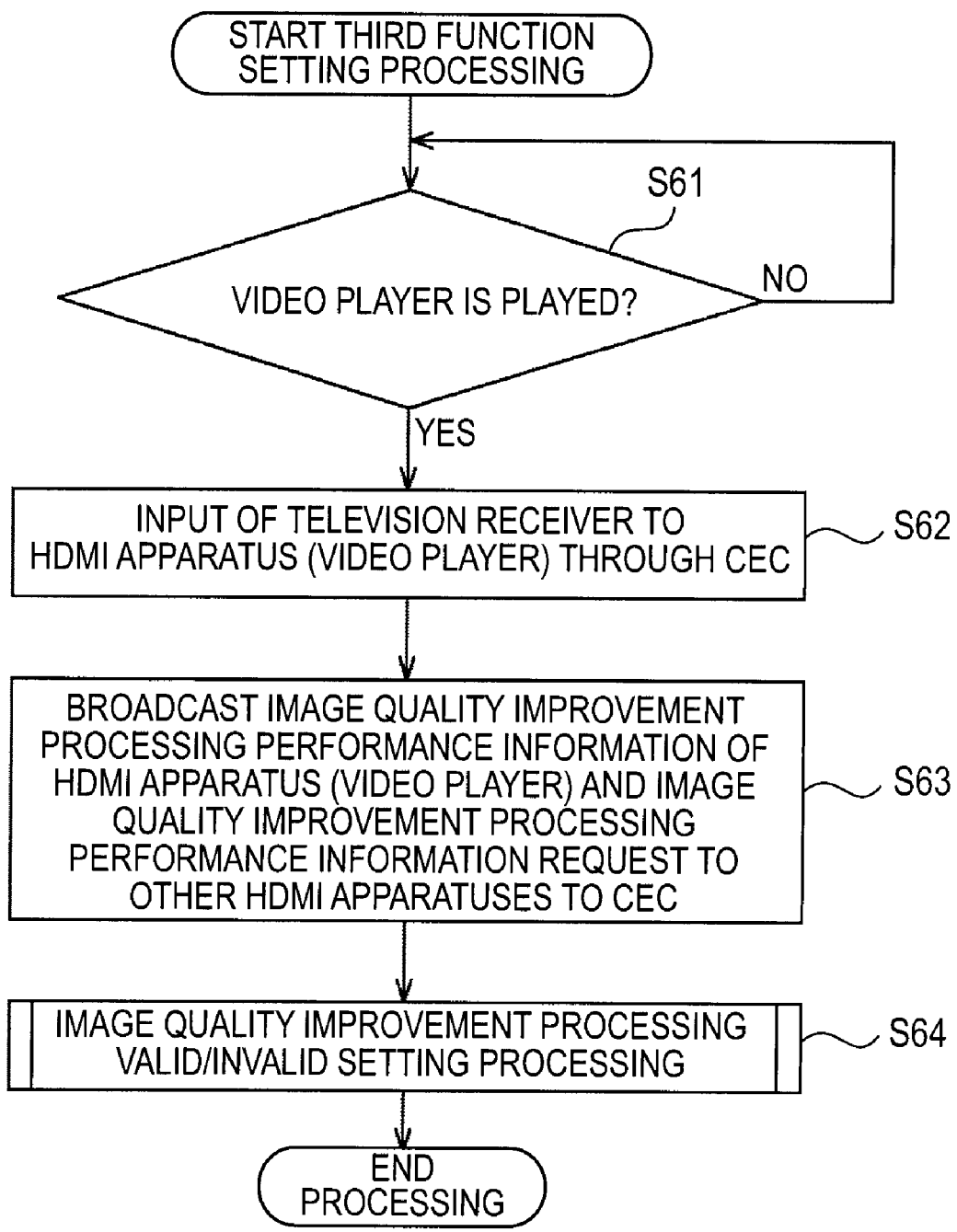
FIG. 6 is a flowchart for explaining an example of third function setting processing.

In this case, the video player 11E executes third function setting processing shown in FIG. 6.

Start of the Third Function Setting Processing

FIG. 6 is a flowchart for explaining an example of the third function setting processing executed by the video player 11E.

In step S61, the video player 11E determines whether the video player 11E is played.

Until the video player 11E is played, the video player 11E determines in step S61 that the video player 11E is not played (NO in step S61) and the processing is returned to step S61. In other words, the processing in step S61 is repeatedly executed until the video player 11E is played.

As explained above, in the second situation, the video player 11E is played. Therefore, the video player 11E determines in step S61 that the video player 11E is played (YES in step S61) and the processing proceeds to step S62.

In step S62, the video player 11E changes the input of the television receiver 11A to the video player 11E through the CEC. Specifically, the video player 11E transmits <Image View ON> and <Active Source> as CEC control information. Consequently, the input of the television receiver 11A is automatically switched to the HDMI input 21A1 by the one touch play function. As a result, the active AV path is switched to the second path.

The above is processing as a premise of the second situation.

In step S63, the video player 11E broadcasts image quality improvement processing performance information of the video player 11E and an image quality improvement processing performance information request to the other HDMI apparatuses 11 to the CEC.

In step S64, the video player 11E determines necessity of image quality improvement processing of the video player 11E and sets valid/invalid of an image quality improvement processing function on the basis of a result of the determination. The HDMI apparatuses 11 execute the image quality improvement processing valid/invalid setting processing shown in FIG. 5.

The image quality improvement processing valid/invalid setting processing shown in FIG. 5 is already explained in step S4 of the first function setting processing shown in FIG. 3. Therefore, explanation of the image quality improvement processing valid/invalid setting processing is omitted.

Consequently, the third function setting processing shown in FIG. 6 ends.

As a specific example, it is assumed that image quality improvement processing performance values of the HDMI apparatuses 11 on the active AV path, in this example, the video player 11E and the television receiver 11A, are "3" and "2", respectively, and the amplifier 11B is the non-corresponding apparatus 11. The third function setting processing in this case is explained.

The video player 11E and the television receiver 11A on the active AV path exchange image quality improvement processing performance information each other by the point of the processing in step S45.

Since the amplifier 11B on the active AV path is the non-corresponding apparatus 11, the amplifier 11B does not transmit image quality improvement processing performance information to the other HDMI apparatuses 11. Specifically, the video player 11E and the television receiver 11A determines in step S43 that time is out for the amplifier 11B. As a result, in step S44, "0" is forcibly allocated to an image quality improvement processing performance value of the amplifier 11B.

In this case, an image quality improvement processing performance value of the video player 11E is a maximum value "3". Therefore, in image quality improvement processing valid/invalid setting processing by the video player 11E, the video player 11E determines in the processing in step S45 that the image quality improvement processing performance of the video player 11E is the highest on the active AV path (YES in step S45). In the processing in step S46, the video player 11E sets an image quality improvement processing function of the video player 11E valid.

On the other hand, in the image quality improvement processing valid/invalid setting processing by the television receiver 11A and the amplifier 11B, the television receiver 11A and the amplifier 11B determine in the processing in step S45 that the image quality improvement processing performances of the television receiver 11A and the amplifier 11B are not the highest on the active AV path (NO in step S45). In the processing in step S47, the television receiver 11A and the amplifier 11B set image quality improvement processing functions of the television receiver 11A and the amplifier 11B invalid.

Consequently, in the second situation, as in the first situation, a video corresponding to the video signal subjected to the image improvement processing only once on the active AV path is displayed on the display unit in the television receiver 11A.

In this way, only the image quality improvement processing by the one HDMI apparatus 11 is applied to the video signal. Therefore, a video of an optimum image quality intended by the designer is displayed.

In the second situation, when the user sets the image quality improvement processing function of the video player 11E invalid on purpose according to operation, as in the first situation, the video player 11E only has to set the image quality improvement processing performance value of the video player 11E to "0" and broadcast the image quality improvement processing performance value to the CEC.

Configuration Example of Image Quality Improvement Processing Performance Information by the CEC FIG. 7 is a diagram of an example of the structure of <Vendor specific Command> of CEC control information adopted as image quality improvement processing performance information.

<Vendor Specific Command> includes a 1-byte Opcode (Operation code) and plural-byte Parameters.

The Opcode is information for specifying a message type. In this embodiment, broadcast is used for notification of image quality improvement processing performance information to the HDMI apparatuses 11 on the active AV path. Therefore, in order to distinguish one HDMI apparatus 11 from the other HDMI apparatuses 11, a <vendor Command with ID> attached with an ID is used as the Opcode. However, the image quality improvement processing performance information may be directly notified and requested to addresses of the HDMI apparatuses 11 on the active AV path. In this case, a <Vendor Command> is used as the Opcode. Each of the HDMI apparatuses 11 transmits and receives a Vendor ID of the HDMI apparatus 11 using the <Vendor Command with ID> of the Opcode and compares received Vendor IDs and a Vendor ID of the HDMI apparatus 11. According to the comparison, the HDMI apparatus 11 determines whether the HDMI apparatus 11 and the other HDMI apparatus 11 are apparatuses of the same manufacturer.

The Parameters include a one-byte [Vendor ID] and plural-byte [Vendor Specific Data] A manufacturer ID of the HDMI apparatus 11 is stored in the [Vendor ID]. The [Vendor Specific Data] includes image quality improvement processing performance information, an image quality improvement genealogy type, and a version number. In this embodiment, image quality improvement processing performance is represented by 1-byte image quality improvement processing performance value. However, in actual operation, it is unrealistic to represent an image quality improvement processing performance value as 1-byte information.

Therefore, the [Vendor Specific Data] may include n-byte image quality improvement processing performance information, an m-byte image quality improvement processing genealogy type, a 1-byte version number, and a development year of a technique for the image quality improvement processing. "m" and "n" are integers equal to or larger than 1.

A result obtained by classifying image quality improvement processing functions for each genealogy type is stored in the m-byte image quality improvement processing genealogy type. Specifically, a result obtained by classifying the image quality improvement processing functions according to classification for each manufacturer of the HDMI apparatuses 11, classification for each manufacturer of an image quality improvement processing circuit, classification for each image quality improvement processing algorithm, and the like is stored. For example, as shown in the figure, image quality improvement processing genealogy types may be classified according to a technique type used in each manufacturer and a version of the technique. Specifically, the image quality improvement processing genealogy types may be classified in such a manner that a technique "XXX" of a television manufacturer A is "0x01" a technique "YYY" of the television manufacturer A is "0x02", and a technique "ZZZ" of an image quality processing LSI manufacturer B is "03x3".

Each of the HDMI apparatuses 11 compares image quality improvement processing genealogy types of the HDMI apparatus 11 and the other HDMI apparatuses 11 in order to compare superiority of image quality improvement processing performances. If genealogy types are the same, the HDMI apparatus 11 compares version numbers or the like represented by lower-order 1 byte. When a version of an image quality improvement processing function of the HDMI apparatus 11 is older than versions of image quality improvement processing functions of the other HDMI apparatuses 11, the HDMI apparatus 11 invalidates the image quality improvement processing function of the HDMI apparatus 11. This makes it possible to prevent image quality improvement processing having the same genealogy type from being applied two or more times.

Example of the Structure of an Image Quality Improvement Processing Performance Information Request by the CEC FIG. 8 is a diagram of an example of the structure of <Vendor Specific Command> of CEC control information adopted as an image quality improvement processing performance information request.

A <Vendor Specific Command> includes a 1-byte Opcode and plural-byte Parameters.

The Opcode is information for specifying a message type. In this embodiment, broadcast is used for notification of an image quality improvement processing performance information request to the HDMI apparatuses 11 on the active AV path. Therefore, in order to distinguish one HDMI apparatus 11 from the other HDMI apparatuses 11, a <vendor Command with ID> attached with an ID is used as the Opcode. However, the image quality improvement processing performance information request may be directly notified and requested to addresses of the HDMI apparatuses 11 on the active AV path. In this case, a <Vendor Command> is used as the Opcode. Each of the HDMI apparatuses 11 transmits and receives a Vendor ID of the HDMI apparatus 11 using the <Vendor Command with ID> of the Opcode and compares received Vendor IDs and a Vendor ID of the HDMI apparatus 11. According to the comparison, the HDMI apparatus 11 determines whether the HDMI apparatus 11 and the other HDMI apparatus 11 are apparatuses of the same manufacturer.

The Parameters include a one-byte [Vendor ID] and n-byte [Vendor Specific Data]. A manufacturer ID of the HDMI apparatus 11 is stored in the [Vendor ID]. The [Vendor Specific Data] includes an n-byte image quality improvement processing performance information request. "n" is an integer equal to or larger than 1.

When an image quality improvement processing performance information request of another HDMI apparatus 11 is broadcasted to the CEC, the HDMI apparatus 11 that receives the image quality improvement processing performance information request broadcasts image quality improvement processing information of the HDMI apparatus 11 to the CEC. The HDMI apparatuses 11 can apply appropriate image quality improvement processing to an input video signal by exchanging the image quality improvement processing performance information with one another in this way.

Hardware Configuration Example of the Image Processing Apparatus

The series of processing explained above can be executed by hardware. The series of processing can also be executed by software. In this case, for example, a personal computer shown in FIG. 9 may be adopted as at least a part of the information processing apparatus explained above.

In FIG. 9, a CPU (Central Processing Unit) 101 executes various kinds of processing according to a computer program recorded in a ROM (Read Only Memory) 102 or a computer program loaded from a storing unit 108 to a RAM (Random Access Memory) 103. Data and the like necessary when the CPU 101 executes the various kinds of processing are also stored in the RAM 103 as appropriate.

The CPU 101, the ROM 102, and the RAM 103 are connected to one another via a bus 104. An input and output interface 105 is also connected to the bus 104. An input unit 106 including a keyboard and a mouse, an output unit 107 including a display, the storing unit 108 including a hard disk, and a communication unit 109 including a modem and a terminal adapter are connected to the input and output interface 105. The communication unit 109 controls communication performed between the computer and other apparatuses (not shown in the figure) via a network including the Internet. A drive 110 is also connected to the input and output interface 105 according to necessity. A removable medium 111 including a magnetic disk, an optical disk, a magneto-optical disk, or a semiconductor memory is inserted in the drive 110 as appropriate. A computer program read out from the removable medium 111 is installed in the storing unit 108 according to necessity.

When the series of processing is executed by software, a computer program configuring the software is installed in, from a network or a recording medium, a computer incorporated in dedicated hardware or a general-purpose computer or the like that can execute various functions by installing various computer programs therein.

A recording medium including such programs includes, as shown in FIG. 9, the removable medium (a package medium) 111 including a magnetic disk (including a floppy disk), an optical disk (including a CD-ROM (Compact Disc-Read Only Memory) and a DVD (Digital Versatile Disc)), a magneto-optical disk (including a MD (Mini-Disk)), or a semiconductor memory distributed separately from an apparatus main body in order to provide the user with the computer programs. Further, the recording medium includes the ROM 102 in which the computer programs are recorded or the hard disk included in the storing unit 108 provided to the user while being incorporated in the apparatus main body in advance.

In this specification, steps that describe the computer programs stored in the program recording medium include not only processing performed in time series according to order of the steps but also processing executed in parallel or individually, although not always executed in time series.

In the example explained above, the present invention is applied to the HDMI apparatuses. However, the present invention can be applied to the entire information processing apparatus in which image quality improvement processing functions are mounted. In this case, naturally, a system for transmitting and receiving a video signal is not limited to the HDMI system and may be arbitrary. Similarly, a system for transmitting and receiving performance of the image quality improvement processing functions is not limited to the CEC system and may be arbitrary.

The present application contains subject matter related to that disclosed in Japanese Priority Patent Application JP 2008-247908 filed in the Japan Patent Office on Sep. 26, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
   video-signal transmitting and receiving means for transmitting and receiving video signals to and from one or more external apparatuses;
   image-quality-improvement processing means for applying image quality improvement processing based on an image quality improvement processing function of the information processing apparatus to the video signals;
   holding means for holding performance of the image quality improvement processing function of the information processing apparatus concerning the image-quality-improvement processing means;
   transmitting means for transmitting the performance of the image quality improvement processing function of the image processing apparatus held by the holding means to the external apparatuses;
   receiving means for receiving one or more performances of one or more image quality improvement processing functions of the one or more external apparatuses; and
   control means for comparing the performance of the image quality improvement processing function of the information processing apparatus held by the holding means and the one or more performances of the one or more image quality improvement processing functions of the one or more external apparatuses received by the receiving means, and controlling, on the basis of a result of the comparison, execution of the image quality improvement processing by the image-quality-improvement processing means.

2. The information processing apparatus according to claim 1, wherein
   the video-signal transmitting and receiving means transmits and receives the video signals to and from the one or more external apparatuses through an HDMI (High Definition Multimedia Interface), and
   the transmitting means and the receiving means transmit or receive the performance(s) of the image quality improvement processing function(s) of the information processing apparatus or the one or more external apparatuses through CEC (Consumer Electronics Control).

3. The information processing apparatus according to claim 1, wherein,
   when the control means determines that the performance of the image quality improvement processing function of the information processing apparatus is highest performance, the control means permits the execution by the image-quality-improvement processing means and, otherwise, the control means prohibits the execution by the image-quality-improvement processing means.

4. The information processing apparatus according to claim 1, wherein the performances of the image quality improvement processing functions are determined by a genealogy type indicating a result obtained by classifying the image quality improvement processing functions according to a predetermined evaluation method.

5. The information processing apparatus according to claim 4, wherein the genealogy type is distinguished according to a technique type in use and versions thereof.

6. An information processing method comprising the step of:
- transmitting and receiving, by an information processing apparatus, video signals to and from one or more external apparatuses;
- applying, by the information processing apparatus, image quality improvement processing based on an image quality improvement processing function of the information processing apparatus to the video signals;
- holding performance of the image quality improvement processing function of the information processing apparatus;
- transmitting, by the information processing apparatus, the performance of the image quality improvement processing function of the image processing apparatus to the external apparatuses;
- receiving, by the information processing apparatus, one or more performances of one or more image quality improvement processing functions of the one or more external apparatuses;
- comparing, by the information processing apparatus, the performance of the image quality improvement processing function of the information processing apparatus and the one or more performances of the one or more image quality improvement processing functions of the one or more external apparatuses; and
- controlling, by the information processing apparatus, on the basis of a result of the comparison, execution of the image quality improvement processing.

7. A computer-readable medium tangibly storing a computer program, when executed by an information processing apparatus, causing the information processing apparatus to perform the step of:
- transmitting and receiving, by the information processing apparatus, video signals to and from one or more external apparatuses;
- applying, by the information processing apparatus, image quality improvement processing based on an image quality improvement processing function of the information processing apparatus to the video signals;
- holding performance of the image quality improvement processing function of the information processing apparatus;
- transmitting, by the information processing apparatus, the performance of the image quality improvement processing function of the image processing apparatus to the external apparatuses;
- receiving, by the information processing apparatus, one or more performances of one or more image quality improvement processing functions of the one or more external apparatuses;
- comparing, by the information processing apparatus, the performance of the image quality improvement processing function of the information processing apparatus and the one or more performances of the one or more image quality improvement processing functions of the one or more external apparatuses; and
- controlling, by the information processing apparatus, on the basis of a result of the comparison, execution of the image quality improvement processing.

8. An information processing system comprising two information processing apparatuses connected to each other, each of the information processing apparatuses including:
- video-signal transmitting and receiving means for transmitting and receiving a video signal to and from the other one of the information processing apparatuses;
- image-quality-improvement processing means for applying image quality improvement processing based on an image quality improvement processing function to the video signal;
- holding means for holding performance of the image quality improvement processing function concerning the image-quality-improvement processing means;
- transmitting means for transmitting the performance of the image quality improvement processing function held by the holding means to the other one of the information processing apparatuses;
- receiving means for receiving one or more performances of one or more image quality improvement processing functions of the other one of the information processing apparatuses; and
- control means for comparing the performance of the image quality improvement processing function held by the holding means and the one or more performances of the one or more image quality improvement processing functions of the other one of the information processing apparatuses received by the receiving means, and controlling, on the basis of a result of the comparison, execution of the image quality improvement processing by the image-quality-improvement processing means.

9. An information processing apparatus comprising:
- a video-signal transmitting and receiving unit configured to transmit and receive video signals to and from one or more external apparatuses;
- an image-quality-improvement processing unit configured to apply image quality improvement processing based on an image quality improvement processing function of the information processing apparatus to the video signals;
- a holding unit configured to hold performance of the image quality improvement processing function of the information processing apparatus concerning the image-quality-improvement processing unit;
- a transmitting unit configured to transmit the performance of the image quality improvement processing function of the image processing apparatus held by the holding unit to the external apparatuses;
- a receiving unit configured to receive one or more performances of one or more image quality improvement processing functions of the one or more external apparatuses; and
- a control unit configured to compare the performance of the image quality improvement processing function of the information processing apparatus held by the holding unit and the one or more performances of the one or more image quality improvement processing functions of the one or more external apparatuses received by the receiving unit, and control, on the basis of a result of the comparison, execution of the image quality improvement processing by the image-quality-improvement processing unit.

10. An information processing system comprising two information processing apparatuses connected to each other, each of the information processing apparatuses including:
- a video-signal transmitting and receiving unit configured to transmit and receive a video signal to and from the other one of the information processing apparatuses;
- an image-quality-improvement processing unit configured to apply image quality improvement processing based on an image quality improvement processing function to the video signal;

a holding unit configured to hold performance of the image quality improvement processing function concerning the image-quality-improvement processing unit;

a transmitting unit configured to transmit the performance of the image quality improvement processing function held by the holding means to the other one of the information processing apparatuses;

a receiving unit configured to receive one or more performances of one or more image quality improvement processing functions of the other one of the information processing apparatuses; and a control unit configured to compare the performance of the image quality improvement processing function held by the holding unit and the one or more performances of the one or more image quality improvement processing functions of the other one of the information processing apparatuses received by the receiving unit, and control, on the basis of a result of the comparison, execution of the image quality improvement processing by the image-quality-improvement processing unit.

* * * * *